(12) United States Patent
Fossum et al.

(10) Patent No.: US 7,646,407 B2
(45) Date of Patent: *Jan. 12, 2010

(54) DIGITAL EXPOSURE CIRCUIT FOR AN IMAGE SENSOR

(75) Inventors: Eric R. Fossum, La Crescenta, CA (US); Alexander I. Krymski, Montrose, CA (US); Roger A. Panicacci, Los Angeles, CA (US); Christopher Clark, Pasadena, CA (US)

(73) Assignee: Micron Technology, Inc., Boise, ID (US)

( * ) Notice: Subject to any disclaimer, the term of this patent is extended or adjusted under 35 U.S.C. 154(b) by 663 days.

This patent is subject to a terminal disclaimer.

(21) Appl. No.: 11/121,956

(22) Filed: May 5, 2005

(65) Prior Publication Data

US 2005/0195314 A1 Sep. 8, 2005

Related U.S. Application Data (63) Continuation of application No. 09/298,306, filed on Apr. 23, 1999, now Pat. No. 6,906,745.

(60) Provisional application No. 60/082,793, filed on Apr. 23, 1998.

(51) Int. Cl.
H04N 5/235 (2006.01)
H04N 3/14 (2006.01)

(52) U.S. Cl. .............. 348/229.1; 348/362; 348/297

(58) Field of Classification Search .............. 348/229.1, 348/362, 297, 221.1; 358/443, 482; 250/208.1
See application file for complete search history.

(56) References Cited

U.S. PATENT DOCUMENTS

| | | | |
|---|---|---|---|
| 4,684,995 A * | 8/1987 | Baumeister | 348/364 |
| 4,686,648 A | 8/1987 | Fossum | |
| 4,744,623 A | 5/1988 | Prucnal et al. | |
| 4,776,925 A | 10/1988 | Fossum et al. | |
| 4,920,069 A | 4/1990 | Fossum et al. | |
| 5,055,900 A | 10/1991 | Fossum et al. | |
| 5,079,622 A * | 1/1992 | Toshinobu | 348/229.1 |
| 5,080,214 A | 1/1992 | Fossum | |
| 5,194,960 A * | 3/1993 | Ota | 348/362 |
| 5,236,871 A | 8/1993 | Fossum et al. | |
| 5,386,128 A | 1/1995 | Fossum et al. | |
| 5,471,515 A | 11/1995 | Fossum et al. | |
| 5,504,524 A * | 4/1996 | Lu et al. | 348/223.1 |
| 5,512,950 A * | 4/1996 | Watanabe et al. | 348/297 |
| 5,548,773 A | 8/1996 | Kemeny et al. | |
| 5,638,123 A * | 6/1997 | Yamaguchi | 348/297 |
| 5,665,959 A | 9/1997 | Fossum et al. | |
| 5,710,954 A * | 1/1998 | Inoue | 396/374 |
| 5,734,426 A * | 3/1998 | Dong | 348/297 |
| 5,793,322 A | 8/1998 | Fossum et al. | |
| 5,822,222 A * | 10/1998 | Kaplinsky et al. | 702/134 |

(Continued)

Primary Examiner—Nhan T Tran
(74) Attorney, Agent, or Firm—Dickstein Shapiro LLP (57) ABSTRACT

Automatic exposure adjusting device considers the image on a pixel-by-pixel basis. Each pixel is characterized according to its most significant bits. After the pixels are characterized, the number of pixels in any particular group is counted. That counting is compared with thresholds which set whether the image is over exposed, under exposed, and can optionally also determine if the image is seriously over exposed or seriously under exposed. Adjustment of the exposure is carried out to bring the image to a more desired state.

22 Claims, 6 Drawing Sheets

U.S. PATENT DOCUMENTS

| | | |
|---|---|---|
| 5,841,126 A | 11/1998 | Fossum et al. |
| 5,880,691 A | 3/1999 | Fossum et al. |
| 5,886,659 A | 3/1999 | Pain et al. |
| 5,887,049 A | 3/1999 | Fossum |
| 5,909,026 A | 6/1999 | Zhou et al. |
| 5,920,274 A * | 7/1999 | Gowda et al. ............... 341/155 |
| 5,949,483 A | 9/1999 | Fossum et al. |
| 5,952,645 A | 9/1999 | Wang et al. |
| 5,990,506 A | 11/1999 | Fossum et al. |
| 5,995,163 A | 11/1999 | Fossum |
| 6,005,619 A | 12/1999 | Fossum |
| 6,008,486 A | 12/1999 | Stam et al. |
| 6,021,172 A | 2/2000 | Fossum et al. |
| 6,040,860 A * | 3/2000 | Tamura et al. ............... 348/252 |
| 6,057,539 A | 5/2000 | Zhou et al. |
| 6,061,091 A * | 5/2000 | Van de Poel et al. ........ 348/364 |
| 6,124,891 A * | 9/2000 | Homma et al. .............. 348/364 |
| 6,141,047 A * | 10/2000 | Kawai et al. ............. 348/224.1 |
| 6,282,462 B1 * | 8/2001 | Hopkins ..................... 700/259 |
| 6,486,503 B1 * | 11/2002 | Fossum ...................... 257/229 |
| 6,515,701 B2 * | 2/2003 | Clark et al. .................. 348/308 |
| 6,816,200 B1 * | 11/2004 | Gough ....................... 348/362 |

\* cited by examiner

DIGITAL EXPOSURE CIRCUIT FOR AN IMAGE SENSOR

CROSS REFERENCE TO RELATED APPLICATIONS

This application is a continuation of application Ser. No. 09/298,306, filed Apr. 23, 1999, now U.S. Pat. No. 6,906,745, which in turn claims the benefit of the U.S. Provisional Application No. 60/082,793, filed on Apr. 23, 1998, the entire disclosures of which are incorporated herein by reference.

BACKGROUND OF THE INVENTION

CMOS active pixel sensors represent a digital solution to obtaining an image of an impinging scene. CMOS technology enables integrating electronics associated with the image sensing onto the chip. This includes, for example, one or more analog-to-digital converters on the chip, as well as timing and control circuitry.

One important feature of a well-defined image is an amount of exposure. Some cameras include automatic gain and exposure control. The automatic gain and exposure control determines if the image is underexposed or overexposed, and can adjust some feature of the image acquisition to correct the exposure amount.

Existing CCD cameras select the exposure time based on some feature of the scene being imaged. Some cameras, for example, compute the average intensity over the entire pixel array. Other cameras compute the average intensity over a central area of the CCD. The average is often calculated by a digital signal processor which is separate from the CCD chip.

SUMMARY OF THE INVENTION

The present system teaches a programmable threshold indicator based on accumulated and programmable measurements of image pieces. The digital image data stream is analyzed by the counting the number of samples within a given interval of intensities to form information indicating an image histogram. The sample count is compared with programmable thresholds.

DESCRIPTION OF THE PREFERRED EMBODIMENTS

The inventors recognize that in some particular images, exposure control by simply computing the average of the image could produce disadvantageous results. For example, consider a scene of black and white stripes. Fifty percent of the image could be very bright, and the other fifty percent could be completely dark. The average is fifty percent which could be considered the correct exposure. Both image portions from the bright scene and the dark scene, however, could be poor.

Figure 1:
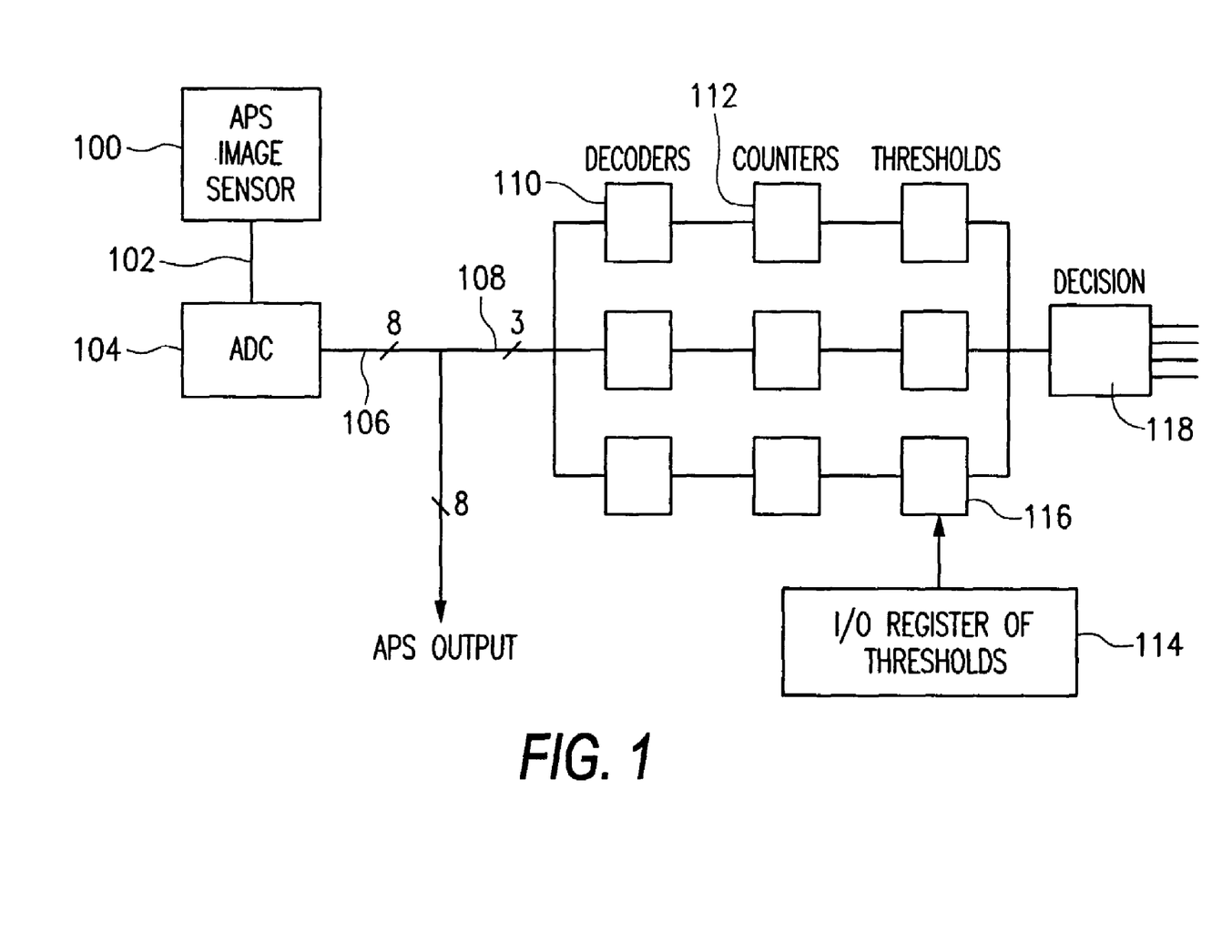
FIG. 1 shows a basic block diagram.

The present system provides a programmable threshold indicator based on measurements of various portions of the image. A block diagram of the system is shown in FIG. 1.

Active pixel image sensor 100 includes an array of units, e.g., rows and columns, of CMOS active pixels. Each preferably includes an in-pixel buffer transistor configured as a source follower, and an in-pixel row or column select transistor. The output of the sensor can be provided either single pixel at a time, or as a parallel group of pixel units 102 to the analog-to-digital converter 104. ADC 104 preferably produces an 8-bit output 106. The two to-three most-significant bits of the analog-to-digital converter are usually enough to analyze intensity distribution.

The three most-significant bits 108 are coupled to pixel characterization elements 110. These detect whether the states of the three bit output 108 have a specified characteristics. When the states have the specified characteristics, the decoder produces an output. Counters 112 count the output, effectively counting the number of times that the bits are coincident with the values. Therefore, the counters 112 keep a count, for each frame, of the number of samples which have specified values.

A number of thresholds are maintained by I/O register 114. Comparing elements 116 compare the counter outputs with the thresholds from the interface register. If one or more of these thresholds are exceeded, then decision block 118 produces a command to either increment or decrement the exposure: e.g., the shutter width or gain of image acquisition. This can be done frame by frame, or for a group of frames.

Figure 2:
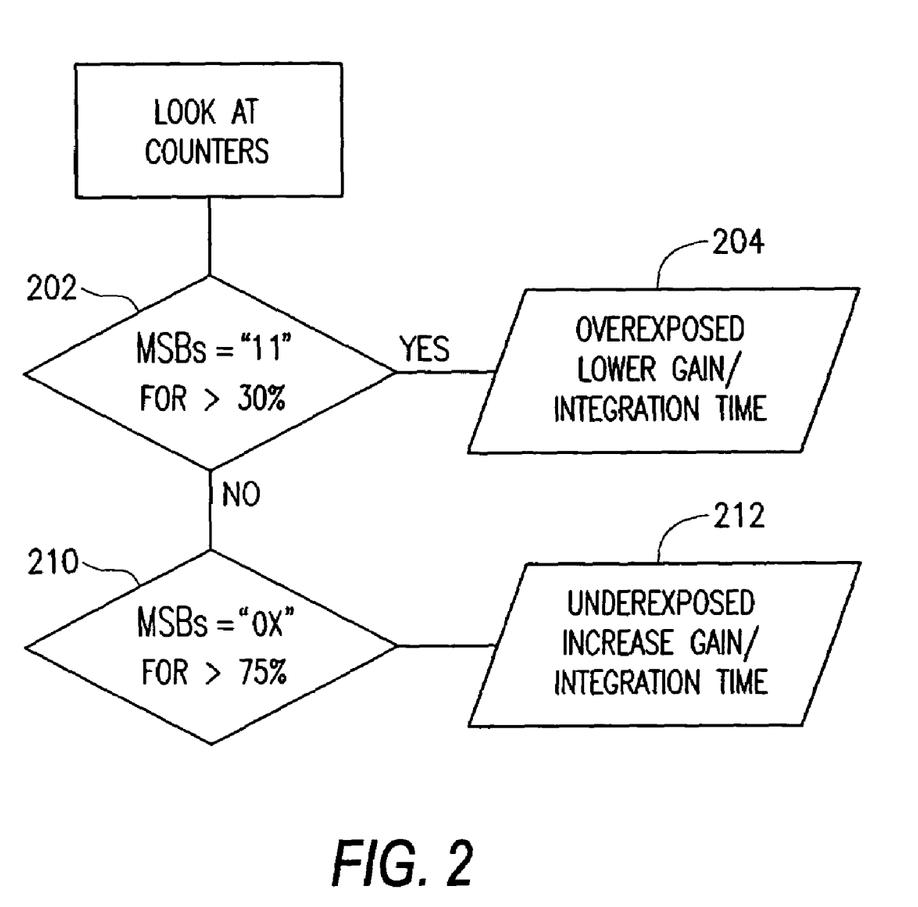
FIG. 2 shows a flowchart of operation of a two-threshold embodiment.

A first embodiment uses a two-threshold simple-scheme. This takes into account only the two most-significant bits. In this scheme, the relative number of data whose MsBs are "11" are counted. The number of data in the lower half segment of the data scale (e.g. the most significant bit [MSB] is equal to 0) is also counted. The data "11" is considered as being close to saturation. An exemplary threshold for the amount of that data can be thirty percent. Similarly, the tolerance for "dark" data, in which the MSB is zero, is restricted to be 75%. Step 202 detects if the first threshold in which both major bits are "11" for more than thirty percent of the data. This is taken as an overexposed condition at 204 and the integration time or gain is lowered. The second threshold is investigated at 210. If five percent of the data is dark (MSB is 0), the data is taken as underexposed data and the integration time or gain is increased.

The thresholds must be selected with an amount of hysteresis which is effective to avoid oscillations when the image has many contrasts i.e. between black and white. For example, the sum of the two percentages should exceed 100 percent.

Figure 3:
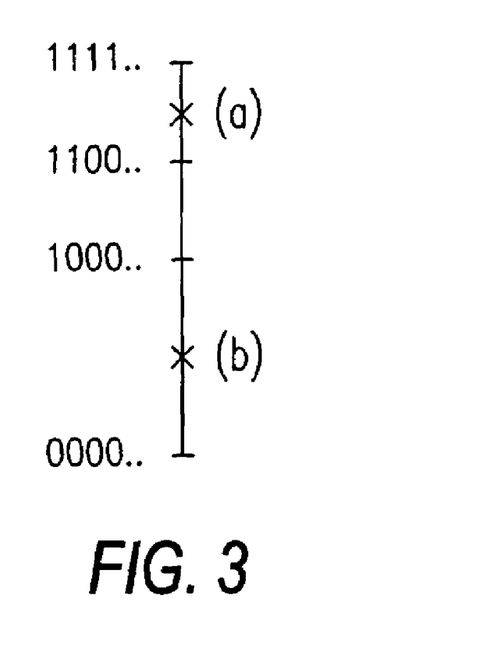
FIG. 3 shows a point diagram of the FIG. 2 embodiment.

FIG. 3 shows a bar graph with the overexposure/underexposure parameters. The point A in FIG. 3 is at an overexposed position. If more than 30 percent of the image is in this position, then the image is taken to be overexposed and the gain or integration time is lowered. Conversely, point B is in an underexposed position. If more than 75 percent of the image is in this position, then the image is taken to be underexposed.

Figure 4:
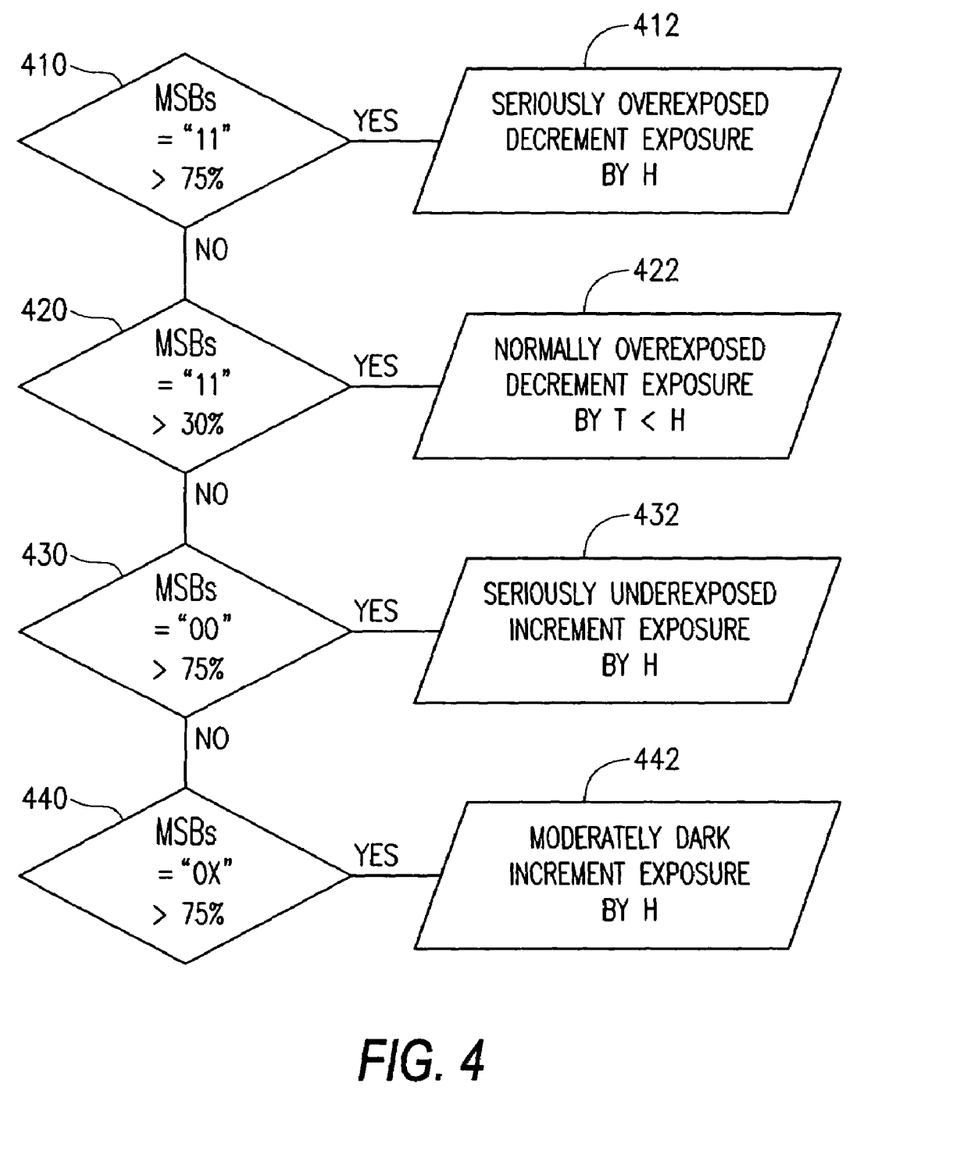
FIG. 4 shows a flowchart of a second, three-threshold embodiment.

A second embodiment which operates according to the flowchart of FIG. 4 uses a three threshold advance scheme. This takes only the two highest bits at the input to the indicator, as in the first system. However, this scheme uses three decoders and three counters as shown in FIG. 1. This system counts: (a) the number of samples in which the upper bits are "11"; (b) the number of samples in which the most significant bit is "0"; and (c) the number of samples in which the upper bits are both "00". This provides more information about the image than the FIG. 2 system. This also enables adjusting the exposure/gain in two steps.

FIG. 4 shows a flowchart of the second embodiment. At step 410, the decision making process determines if the relative number of samples determined by a, in which both MsBs are "11" is more than 75 percent. If so, then the image is considered to be grossly overexposed. At step 406, the exposure/gain is decremented by a higher value H.

If the result of step 410 is No, step 420 tests if the relative number of samples is more than 30 percent. If so, the image is considered as being normally overexposed at 422. A tuning decrement T is applied at step 422 where T less than H.

If the relative number of sample c, the very dark pixels, is more than 75 percent at step 430, then the image is considered as seriously underexposed. In this case, the exposure/gain is incremented by the higher value H at step 432.

Finally, if none of the other steps are true, the relative number of samples b, that is moderately dark pixels that are not very dark, are tested at 440. If this value is more than 75 percent detected at step 416, then the image is considered as moderately dark at 442. A tuning increment T is added to the exposure or gain.

This can be carried out on a frame by frame basis. These thresholds can also be programmable, to allow more bright or dark scenes. The programmable thresholds can be made by user manual intervention, or by an automatic intervention from the computer system.

Figure 5:
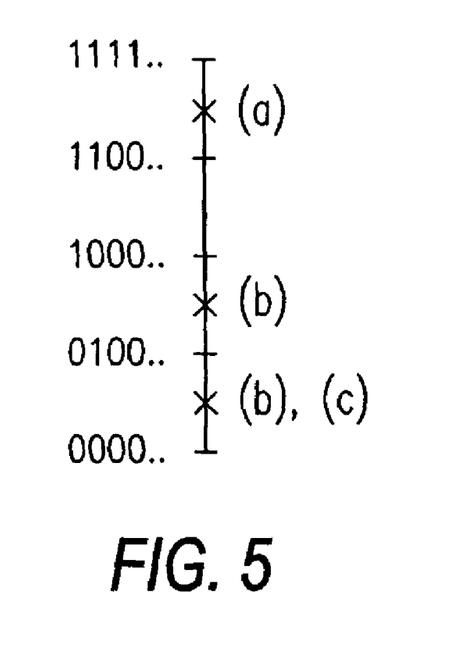
FIG. 5 shows a point chart.

FIG. 5 shows a bar chart showing the placement of the pixels within groups a, b, or c, similar to that in FIG. 3.

Figure 6:
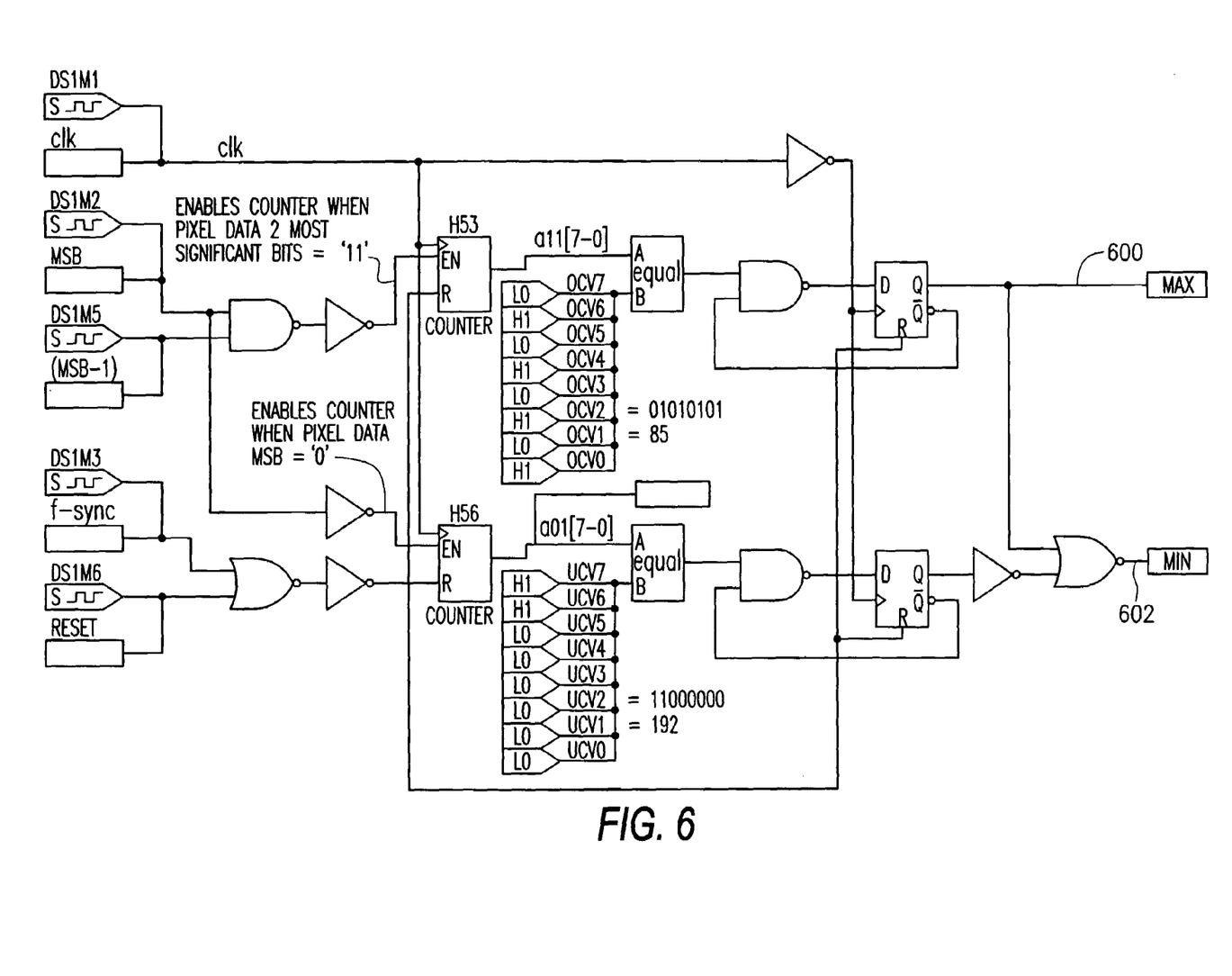
FIG. 6 shows exemplary circuitry for carrying out this embodiment.

An example circuitry is shown in FIG. 6. It should be understood that this circuitry is exemplary only, and that other similar circuits could be easily formed using either a processor or hard wire gates using hardware definition language. Of course, this operation could also be carried out using a programmed processor.

Figure 7:
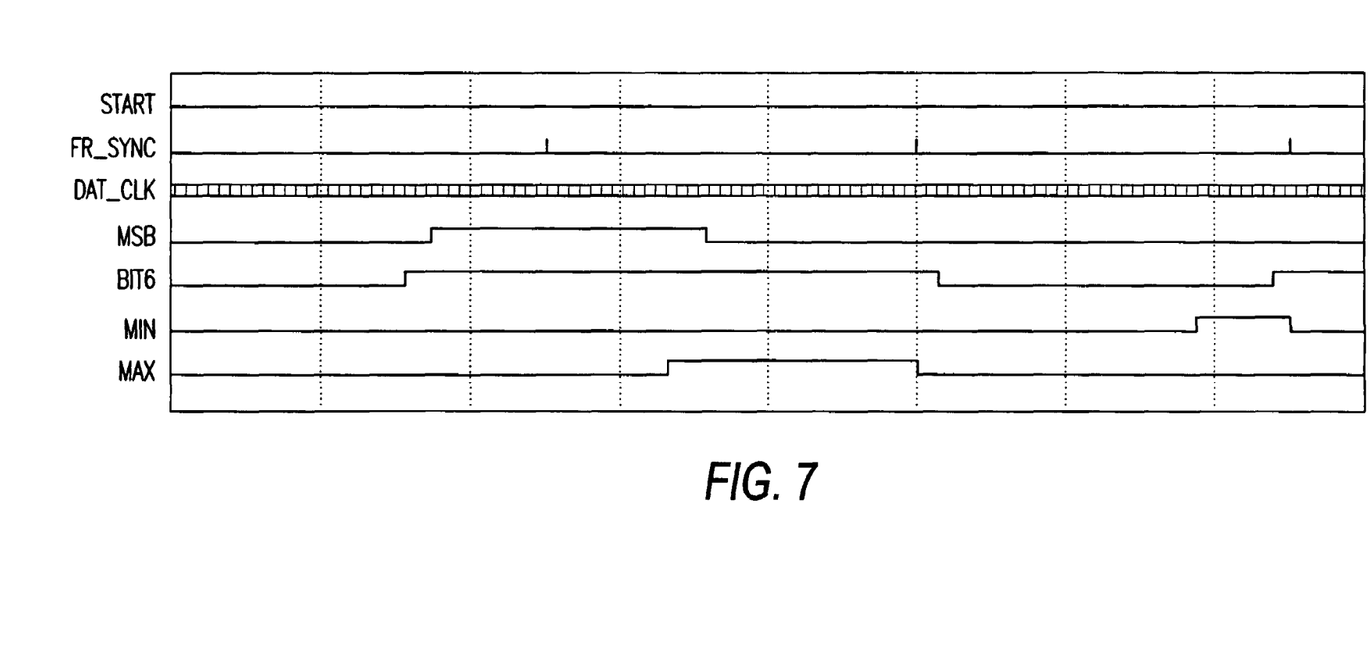
FIG. 7 shows results of simulation.

FIG. 7 shows results of a simulation using a simple test. The circuit signals maxed during the second frame as the number of 11 sample has exceeded 30 percent and min in the third frame as after two 00 counts has approached 75 percent of the total samples.

Although only a few embodiments have been disclosed above, other modifications are within the disclosed features.

For example, the system as described could be carried out using a processor or a digital signal processor. Preferably, however, all of the subjects in FIG. 1 are carried out on the same substrate.

What is claimed is:

1. A camera comprising:
    an image sensor having a plurality of pixels, and further having an exposure adjustment capability;
    an analog to digital converter which produces a digital output comprising a plurality of bits, said digital output indicative of an output of each pixel of said image sensor;
    at least one first counter which counts a number of overexposed parts of said digital output;
    at least one second counter which counts a number of underexposed parts of said digital output;
    at least one threshold detector for comparing counting results of said first and second counters with desired thresholds;
    an exposure decision element, which is capable of making a decision to either increase or decrease a next frame of exposure of said image sensor based on a detected relation of said counting results with said thresholds.

2. A camera as in claim 1, further comprising at least one coincidence detector, which reviews only a predetermined number of most significant bits of said digital output.

3. A camera as in claim 2, wherein said first counter counts a number of pixels whose most significant bits include ones.

4. A camera as in claim 3, wherein said second counter counts a number of pixels in which said most significant bits include a zero.

5. A camera as in claim 3, in which said second counter counts a number of pixels whose most significant bits include at least one zero.

6. A camera as in claim 5, wherein said at least one threshold detector includes values indicative of what percentage of the image can have underexposed or overexposed pixels, said decision element increasing or decreasing said next frame of exposure based on said percentages.

7. A camera as in claim 2, wherein said at least one coincidence detector further comprises two coincidence detectors representing relationships with two different thresholds, one of which is for an overexposed image and another of which is for an underexposed image.

8. A camera as in claim 7, wherein said decision element is configured to reduce said next frame of exposure when an overexposed image is detected and increase said next frame of exposure when an underexposed image is detected.

9. A camera as in claim 2, wherein said at least one coincidence detector further comprises at least three coincidence detectors each detecting a different one of: an overexposed image; an underexposed image; a seriously underexposed image; and a seriously overexposed image.

10. A camera as in claim 9, further comprising a threshold storing element for storing first and second increase and decrease increments, wherein said decision element is configured to:
    increase said next frame of exposure by said first increment when an underexposed image is detected;
    decrease said next frame of exposure by said first increment when an overexposed image is detected;
    increase said next frame of exposure by said second increment when a seriously underexposed image is detected; and
    decrease said next frame of exposure by said second increment when a seriously overexposed image is detected.

11. A camera as in claim 1, wherein said image sensor includes an active pixel sensor with a plurality of pixels of a CMOS image sensor, each pixel including an in-pixel buffer transistor and an in-pixel selection transistor.

12. A camera as in claim 1, wherein said desired thresholds comprise a first threshold for a seriously deficient image and a second threshold for a less seriously deficient image, said first and second thresholds collectively adding up to more than 100%.

13. A camera as in claim 1, wherein said exposure is one of a shutter width or a gain of the image sensor.

14. An automatic exposure adjusting CMOS image sensor device, comprising:
    an image sensor, including a plurality of adjustable photoreceptors, each photoreceptor defining a pixel of the image, and said image sensor having an adjustable exposure which when increased, increases an amount of exposure for a next frame of the image, and when decreased, decreases an amount of exposure for said next frame of the image;
    an analog to digital converter which obtains an analog output from said image sensor and produces a digital output indicative of said analog output to thereby produce a plurality of digital outputs for said plurality of pixels;

a pixel characterization element, representing certain most significant bits of at least a plurality of said digital outputs, to thereby characterize said pixel according to its exposure characteristic;

a counter element, which counts numbers of pixels characterized by said pixel characterization element and compares said count with certain thresholds; and an image adjusting element, for adjusting said exposure based on said count.

15. A device as in claim 14, further comprising a memory storing said thresholds, and said memory is variable to change said thresholds.

16. A method of operating a camera, the method comprising:

obtaining a plurality of digital values, said plurality of digital values representing values of pixel signals of an image sensor;

setting a first variable threshold for overexposed pixels;

setting a second variable threshold for underexposed pixels;

characterizing said digital values according to a number of most significant bits of said pixels and not all bits of said pixels and investigating said most significant bits to determine if they represent overexposed pixels, normally-exposed pixels, or underexposed pixels;

counting said characterized digital values; and if the number of overexposed pixels is greater than said first threshold, then decreasing an exposure for a next frame and if the number of under exposed pixels is greater than said second threshold then increasing the exposure for the next frame.

17. A method as in claim 16, wherein characterizing a digital value as an overexposed pixel includes determining that the two most significant bits are "11".

18. A method as in claim 17, wherein characterizing a digital value as an underexposed pixel includes determining that at least one most significant bit is zero.

19. A method as in claim 16, further comprising detecting seriously overexposed and underexposed pixels as well as moderately overexposed and moderately underexposed pixels.

20. A method as in claim 19, wherein said increasing and decreasing an exposure comprises changing the exposure by one amount for seriously overexposed or underexposed pixels and changing the exposure by another amount for moderately underexposed or overexposed pixels.

21. A method as in claim 17, wherein said first threshold is initially set at about 30% of the total number of the pixels of said image sensor.

22. A method as in claim 18, wherein said second threshold is initially set at about 75% of the total number of the pixels of said image sensor.

\* \* \* \* \*

UNITED STATES PATENT AND TRADEMARK OFFICE
CERTIFICATE OF CORRECTION

PATENT NO.       : 7,646,407 B2
APPLICATION NO. : 11/121956
DATED            : January 12, 2010
INVENTOR(S)      : Fossum et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1280 days.

Signed and Sealed this

Sixteenth Day of November, 2010

David J. Kappos
*Director of the United States Patent and Trademark Office*